No. 879,812. PATENTED FEB. 18, 1908.
W. H. BUTTON & E. DYER.
FISHING TOOL.
APPLICATION FILED NOV. 11, 1907.
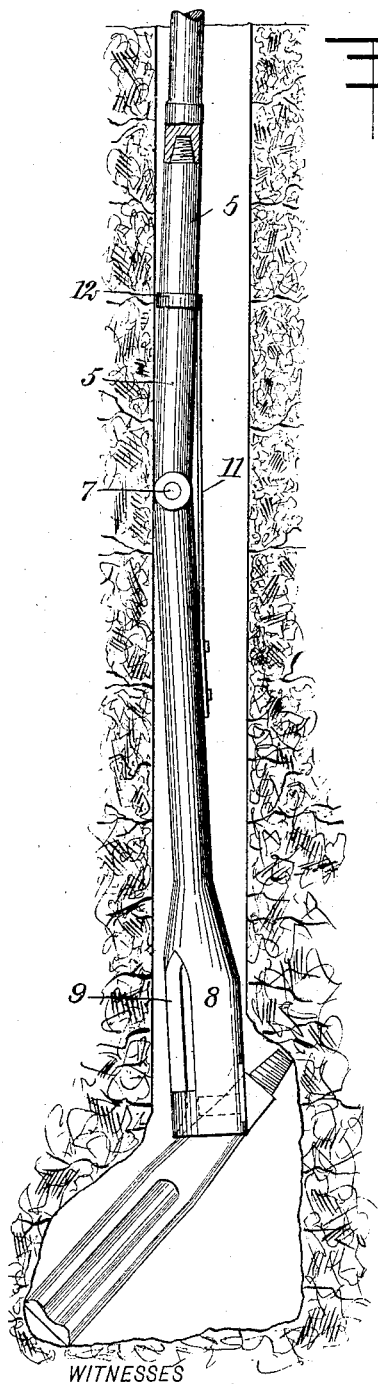
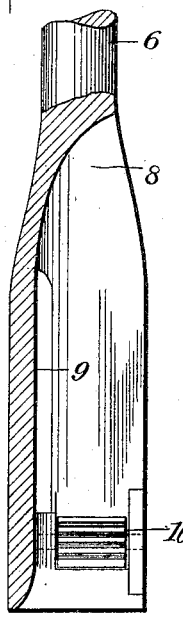
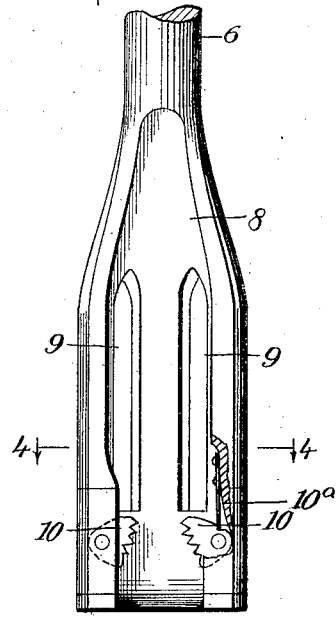
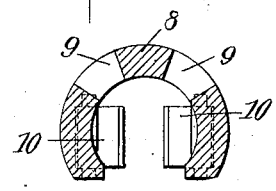
WITNESSES
INVENTORS
William H. Button
Elbert Dyer
BY
ATTORNEYS

UNITED STATES PATENT OFFICE.

WILLIAM HENRY BUTTON AND ELBERT DYER, OF BANDON, OREGON.

FISHING-TOOL.

No. 879,812.  Specification of Letters Patent.  Patented Feb. 18, 1908.

Application filed November 11, 1907. Serial No. 401,589

*To all whom it may concern:*

Be it known that we, WILLIAM HENRY BUTTON and ELBERT DYER, both citizens of the United States, and residents of Bandon, in the county of Coos and State of Oregon, have invented a new and Improved Fishing-Tool, of which the following is a full, clear, and exact description.

This invention is an improved tool for fishing out drills and other like devices from oil wells, Artesian wells and other borings.

The object of the invention is to provide a tool of this nature, which will operate to effectively grip tools which have been lost in borings, whether they be in an upright position or have fallen over to one side.

Reference is to be had to the accompanying drawings forming a part of this specification, in which similar characters of reference indicate corresponding parts in all the views.

Figure 1 illustrates in side elevation a fishing tool embodying our invention, showing the manner in which the same operates to remove from the boring a drill which has fallen over to one side; Fig. 2 is a central vertical sectional view of the lower portion of the tool; Fig. 3 is a face view of the same; and Fig. 4 is a cross-section on the line 4—4 of Fig. 3 looking in the direction of the arrows.

The tool as preferably constructed is composed of two bars or sections 5 and 6, jointedly connected together intermediate their length by the pivot-pin 7. The upper section 5, which is ordinarily the shorter section, is provided with the usual or other desired means for connecting it to the drill-rod, and the lower section 6 is, at its lower end, constructed with an enlarged semi-cylindrical or gouge-shaped head 8; the latter being provided on its rear face, at each side of the center, with cut-out portions or slots 9 to avoid making the tool unduly heavy.

Within the head 8 and near the bottom end thereof are provided oppositely-disposed gripping-jaws 10, having opposed serrated gripping-faces converging in an upward direction when in normal position. These gripping-jaws 10 are pivoted in recesses formed in the walls of the head, and are so balanced that they will normally assume the position shown in Fig. 3, under the action of springs 10ᵃ, and in which position the under faces of the jaws rest upon the shoulders of the recesses in which they are movably mounted. As is best observed in Fig. 3, the opening in the front face of the head is of diminished width at the lower portion thereof, in order to provide sufficient metal for the outer bearings or pivots of the gripping-jaws.

The two sections of the tool are normally thrown out of alinement by a spring 11, which gives the tool a natural tendency to pass lineally over a drill which has fallen over to one side or occupies an angular position with respect to the boring, as shown in Fig. 1. The spring 11 is rigidly attached to one of the sections of the drill and has a sliding connection with the other section through an encircling ring or band 12.

It is apparent from the disposition of the jaws 10, that when the tool is lowered into the well, the said jaws will admit of the shank thereof passing upwardly between them, and will swing on their pivots until the gripping-faces thereof are substantially parallel. On then drawing on the tool, the jaws will bite into the drill and effectively grip the same, whereby it may be withdrawn and removed.

The invention may obviously be modified in numerous particulars from that shown and described, and we consider that we are entitled to such changes as fall within the scope of the appended claims.

Having thus described our invention, we claim as new and desire to secure by Letters Patent:

1. In a tool of the character described, jointed sections, one of which is provided with gripping means, and means normally operating to throw said sections out of alinement.

2. In a tool of the character described, a bar having a gouge-shaped head, and gripping-jaws pivotally mounted within recesses of said head and having opposed gripping-faces normally converging upwardly.

3. In a tool of the character described, a bar having an enlarged head of substiantally semi-cylindrical form, and gripping-jaws pivoted within said head having opposed gripping-faces converging upwardly when in normal position.

4. In a tool of the character described, a bar composed of two sections pivoted together, means for attaching one of said sections to a drill-rod or the like, automatic gripping means carried by the other section, and means operating to throw said sections out of alinement.

5. In a tool of the character described, a bar composed of sections pivoted together, gripping means carried by one of said sections, and a spring operating to throw said sections out of alinement.

6. In a device of the character described, a bar composed of two sections pivoted together, means for attaching one of said sections to a drill-rod or the like, automatic gripping means carried by the other section, and a spring attached to one of said sections and having a sliding connection with the other section and operating to throw said sections out of alinement.

7. In a tool of the character described, a bar composed of a plurality of jointed sections, one of which is provided with a gouge-shaped head, and gripping-jaws pivoted within said head having opposed gripping-faces converging upwardly.

In testimony whereof we have signed our names to this specification in the presence of two subscribing witnesses.

WILLIAM HENRY BUTTON.
ELBERT DYER.

Witnesses:
E. E. OAKES,
C. M. SPENCER.